(12) United States Patent
Balogh

(10) Patent No.: US 6,868,229 B2
(45) Date of Patent: Mar. 15, 2005

(54) INTERFERING WITH ILLICIT RECORDING ACTIVITY BY EMITTING NON-VISIBLE RADIATION

(75) Inventor: Stephen P. Balogh, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 398 days.

(21) Appl. No.: 09/957,810

(22) Filed: Sep. 20, 2001

(65) Prior Publication Data

US 2005/0008324 A1 Jan. 13, 2005

(51) Int. Cl.⁷ .............................................. H04N 5/225
(52) U.S. Cl. ..................... 386/117; 386/46; 386/94; 380/201; 380/202; 380/203; 352/47; 352/97; 352/135
(58) Field of Search ............................ 386/46, 94, 117; 380/201, 202, 203; 352/47, 55, 97, 133, 244

(56) References Cited

U.S. PATENT DOCUMENTS

| | | | | |
|---|---|---|---|---|
| 5,023,709 A | * | 6/1991 | Kita et al. ................... | 348/172 |
| 5,907,350 A | * | 5/1999 | Nemirofsky ................. | 725/23 |
| 5,959,717 A | * | 9/1999 | Chaum ........................ | 352/40 |
| 6,542,618 B1 | * | 4/2003 | Rhoads ....................... | 382/100 |
| 2002/0124171 A1 | * | 9/2002 | Rhoads ....................... | 707/104.1 |

FOREIGN PATENT DOCUMENTS

JP          2001313006 A   *  11/2001   ............ H01K/7/00

* cited by examiner

Primary Examiner—Vincent Boccio
Assistant Examiner—James A. Fletcher
(74) Attorney, Agent, or Firm—Steven D. Yates

(57) ABSTRACT

Often, during an event, such as a movie, play, concert, opera, etc., viewers of the event attempt to illicitly record the event. Such illicit recording attempts may be interfered with by using emitters that emit radiation that interferes with recording and/or operation of the recording devices. For example, infrared emitters may be used to saturate an event viewing area. The infrared, while non-visible to human viewers, is received and recorded by recorders using charge-coupled devices (CCDs), such as conventional digital cameras, movie cameras, television cameras, telescopes, etc. Other radiation can be emitted based on the type of recorder with which one desires to interfere. Alternatively, or in addition thereto, emitters may also be used to send commands to recorders, such as stop, rewind, eject, etc., to interfere with operation of the recorders.

27 Claims, 4 Drawing Sheets

INTERFERING WITH ILLICIT RECORDING ACTIVITY BY EMITTING NON-VISIBLE RADIATION

FIELD OF THE INVENTION

The invention generally relates to preventing illicit recording of events, and more particularly to emitting non-visible radiation, such as infrared, so as to interfere with recording devices.

BACKGROUND

In recent years, charge-coupled devices (CCDs) have been used within recording devices such as still-shot cameras, movie cameras, television cameras, telescopes, and other recording devices.

A charge-coupled device (CCD) is an instrument comprising an array of light sensitive elements, such as capacitors, that are charged by incoming light and the generated current is recorded. CCDs are advantageous in recording devices since CCDs are highly sensitive to light, and due to their inherent digital nature, easily incorporated into electronic machines. For example, in telescopes for recording celestial images, CCDs record a higher percentage of light reaching the CCD than does conventional film-based telescopes.

In addition to visible light, CCDs are also sensitive to non-visible radiation.

BRIEF DESCRIPTION OF THE DRAWINGS

The features and advantages of the present invention will become apparent from the following detailed description of the present invention in which.

DETAILED DESCRIPTION

Figure 1:
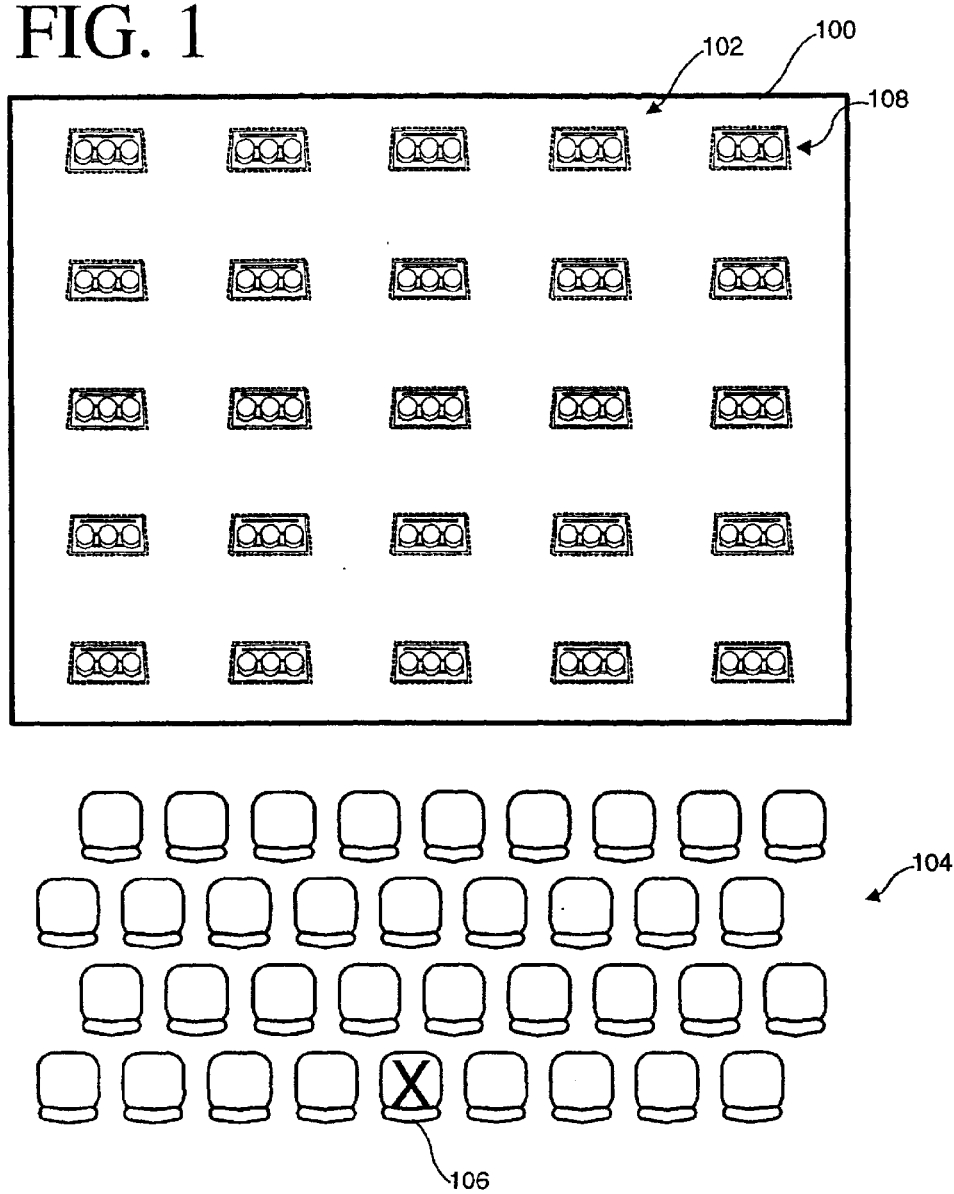
FIG. 1 illustrates an environment according to one embodiment of the invention for using projectors of non-visible radiation to interfere with illicit attempts to record an event with a recorder sensitive to the non-visible radiation.

FIG. 1 illustrates an environment according to one embodiment of the invention.

Illustrated is a focus region 100, such as a movie theater screen, television screen, computer monitor, stage, outdoor area, or other area in which viewer attention is focused. In the illustrated embodiment, it is assumed the focus region is a screen, and projectors 102, illustrated with dashed lines and not drawn to scale, are behind the focus region 100 with an opening or openings in screen through which projections occur. In another embodiments, the projectors may be mounted within the focus region, e.g., for a stage, the projectors may be mounted on the surface of props.

Also illustrated are viewing positions 104, which may be theater seats or the like. In the illustrated embodiment, one of the viewing positions 106 represents someone attempting within the viewing positions that is attempting to illicitly record an event, such as a pre-recorded event, such as a movie, or live presentation, e.g., a play, concert, opera, etc. Projectors 102 are used to confound this illicit activity. In particular, advantageous usage may be made of known sensitivity of CCDs to certain non-visible radiation, such as infrared that can not be seen by people. When a CCD based recorder receives infrared input, the input is recorded as visible light. Typically, infrared input is recorded as white light at varying intensities, e.g., it is recorded as a gray-scale image. The non-visible infrared input can be used to interfere with illicit recording attempts of an event, or to introduce an infrared watermark or copyright notice on a recording, without affecting viewing of the event by people.

The illustrated projectors 102 have one or more emitters 108 that emit infrared and/or other non-visible light that is subsequently received and recorded by recording devices such a CCD based video cameras, digital cameras, etc. It will be appreciated that other recording media sensitive to non-visible light may also be similarly manipulated. For example, if an alternate light sensitive technology, such as complementary metal-oxide-semiconductor (CMOS) Active Pixel Sensors (APS) replaces conventional use of CCDs in recording devices, then the projectors may be configured to emit non-visible radiation that affects the alternate light sensitive technology in a manner similar to the effect of infrared on CCDs.

In one embodiment, the projectors are configured to blanket the viewing area 104 with infrared light, causing the illicit recorder 106 to record a washed out image. Or, assuming a sufficient number of projectors, in another embodiment, the projectors are configured to project a pattern forming words, such as a Federal Bureau of Investigation (FBI) warning, copyright information, purchase information to allow an illicit recorder opportunity to purchase a legitimate copy of the event, an arbitrary image, or the like.

In one embodiment, the projectors 102 may be configured to emit known infrared commands designed to stop or interfere with an illicit recording. Most recording devices provide an infrared interface for controlling the recording device. Thus, for example, along with projecting a pattern to recording devices, the projectors could also emit all known stop, rewind, eject, etc. commands for recording devices. Thus, to an unsophisticated thief, the recording device would appear to malfunction. Assuming multiple emitters 108 within a projector, a single projector may simultaneously interfere with image recording while also emitting control commands.

In one embodiment, the projectors 102 emit the above described interference continually throughout the event. In another embodiment, the interference is emitted randomly. In a still further embodiment, the interference emissions are queued to particular moments of the event. For example, certain moments of high interest in an event may be interfered with so as to allow an illicit recorder to believe a recording was successful. That is, when the illicit recording is played back, after successful viewing for some period of time, at an important moment during the event, e.g., a key scene in a movie or play, the quality of the recording is substantially degraded due to the emitted interference.

Figure 2:
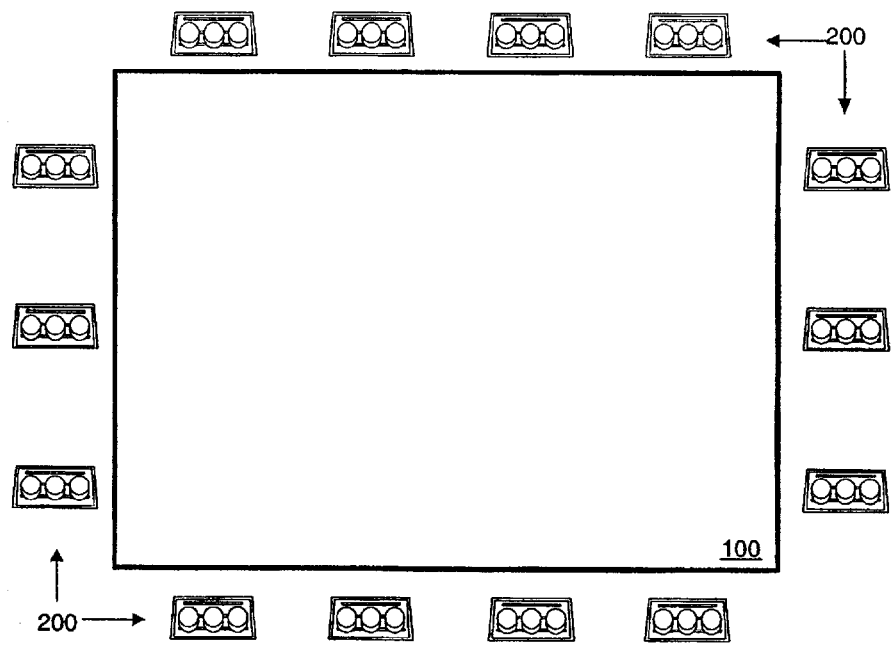
FIG. 2 illustrates an alternate configuration for the FIG. 1 projectors of non-visible radiation.
Figure 2:
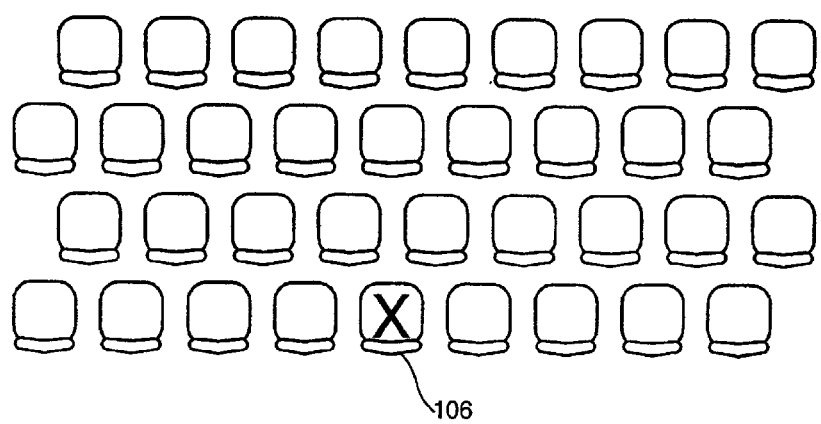

FIG. 2 illustrates an alternate environment according to one embodiment of the invention, in which.

Illustrated is a focus region 100 as in FIG. 1, but in this embodiment the projectors 200 are disposed about the focus region, instead of on or behind the focus region as with the projectors 102 of FIG. 1. As with FIG. 1, the projectors are not drawn to scale. As discussed above, the projectors may be used to emit interference for an illicit recording device. In one embodiment, the illustrated projectors may be configured to direct their emissions in certain directions or patterns, e.g., to move like a search light or laser show light. In one embodiment, the projectors are moved so as to spell out words or patterns on receiving recorders.

In another embodiment, rather than projecting towards an illicit recorder 106, instead the focus region 100 is coated in a material that is highly reflective to the radiation emitted from the projectors 200. That is, assuming infrared based projectors, and the focus region is a screen, then the screen is coated with a material that absorbs and reflects the projected infrared. In this embodiment, the projectors are directed towards the screen, and as discussed above, the projectors are directed to draw words and/or patterns on the screen that are not visible to intended audience viewers, but that nonetheless ruin an illicit recording. It will be appreciated that the techniques of FIG. 1 and FIG. 2 may be employed simultaneously. It will be further appreciated that emitting towards the illicit recorder or towards the focus region may be configured to operate in conjunction with movement through space so as to give the appearance of a large image or message displayed by the moving emitters.

In one embodiment, since more and more devices are being configured with short range communication technology, such as BlueTooth, wireless plug and play, and other wireless technology, a transceiver (not illustrated) is used to query for the identity of recorders within range of the transceiver. In such fashion, commercial recording devices may be able to announce the identify of the recorder owner, or at least to place management of an event on notice that an illicit recording may be occurring.

Figure 3:
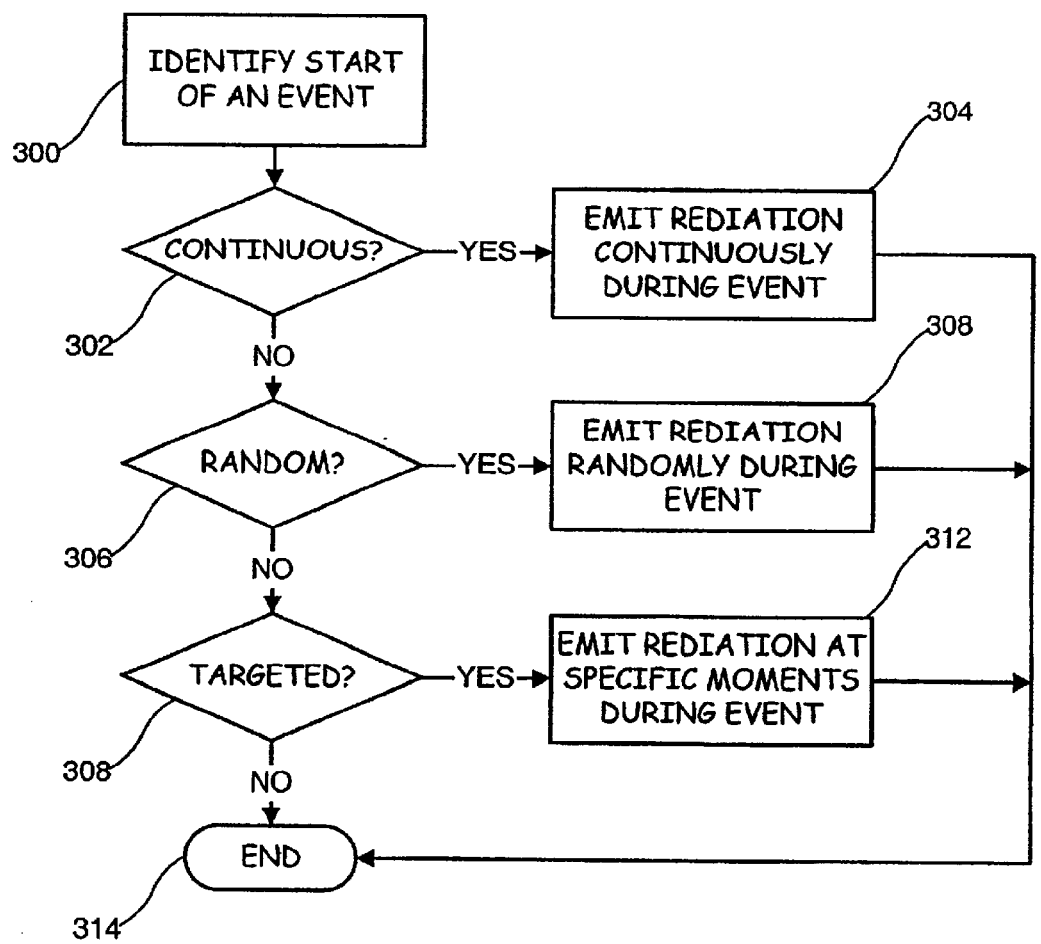
FIG. 3 is a flowchart according to one embodiment of the invention for controlling the FIG. 1 projectors.

FIG. 3 illustrates a flowchart according to one embodiment for initializing and/or actively managing projectors 102, 200 of FIG. 1 and FIG. 2. The projectors may be stationary, e.g. having non-moving emitters, or they may be directed or moved about to blanket an area with a desired radiation, e.g., infrared or other emission. Initialization and/or management of projectors may be controlled by a machine such as is described with reference to FIG. 4.

A first illustrated operation is the determination 300 that an event has started. Such determination may occur by way of a signal received at the start of an event, such as from a signal embedded within a movie, by monitoring an environment for a change, such as dimming lighting, by manual human indication, or by other indication. Different emission techniques may be applied to interfere with illicit recordings, e.g., as discussed above, emissions may be designed to interfere with recorded images, while other emissions are designed to interfere with operation of recording devices.

In the illustrated embodiment, a test 302 may be performed to determine whether continuous emissions, such as blanketing a presentation environment with infrared, will be used. If so, then the projectors 102, 200 are configured and/or actively directed to continuously emit 304 a desired radiation as desired. In one embodiment, a projector controller, e.g., a machine such as in FIG. 4, assigns a particular task to a projector, e.g., engage in continuous emission. In one embodiment, once assigned a task, projector performs the task without further direction from the projector controller until a new task is assigned. In another embodiment, the controller remains in intermittent or continuous communication with the projectors to control their activity.

If 302 continuous emission is not desired, a test 306 may be performed to determine whether random emissions will be used. For example, to minimize wear on emitters, or reduce electricity consumption, the projectors may be utilized at random intervals during the event. If so, then the projectors 102, 200 are configured and/or actively directed to randomly emit 308 a desired radiation as desired.

If 306 random emission is not desired, a test 306 may be performed to determine whether targeted emissions will be used. For example, rather than interfering with an entire event, instead, certain portions of the event that are deemed of interest, such as an emotional moment within an event, are flagged for interference. During these moments of interest, illicit recording devices are interfered with. This embodiment allows one to partially illicitly record an event before receiving interference. As discussed above, emissions may be configured to display messages on recorders, and such messages may include instructions for obtaining a legitimate copy of the event. Thus, if targeting is to be used, then the projectors 102, 200 are configured and/or actively directed to emit 312 radiation at specific moments during the event as desired.

If no emissions are desired, or when emissions are completed, such as at the end of the event, then processing ends 314. Ending processing may include a determination (not illustrated) of the end of the event, such as, for a movie, due to an end signal embedded within the event, or based on some other signal or cue.

Figure 4:
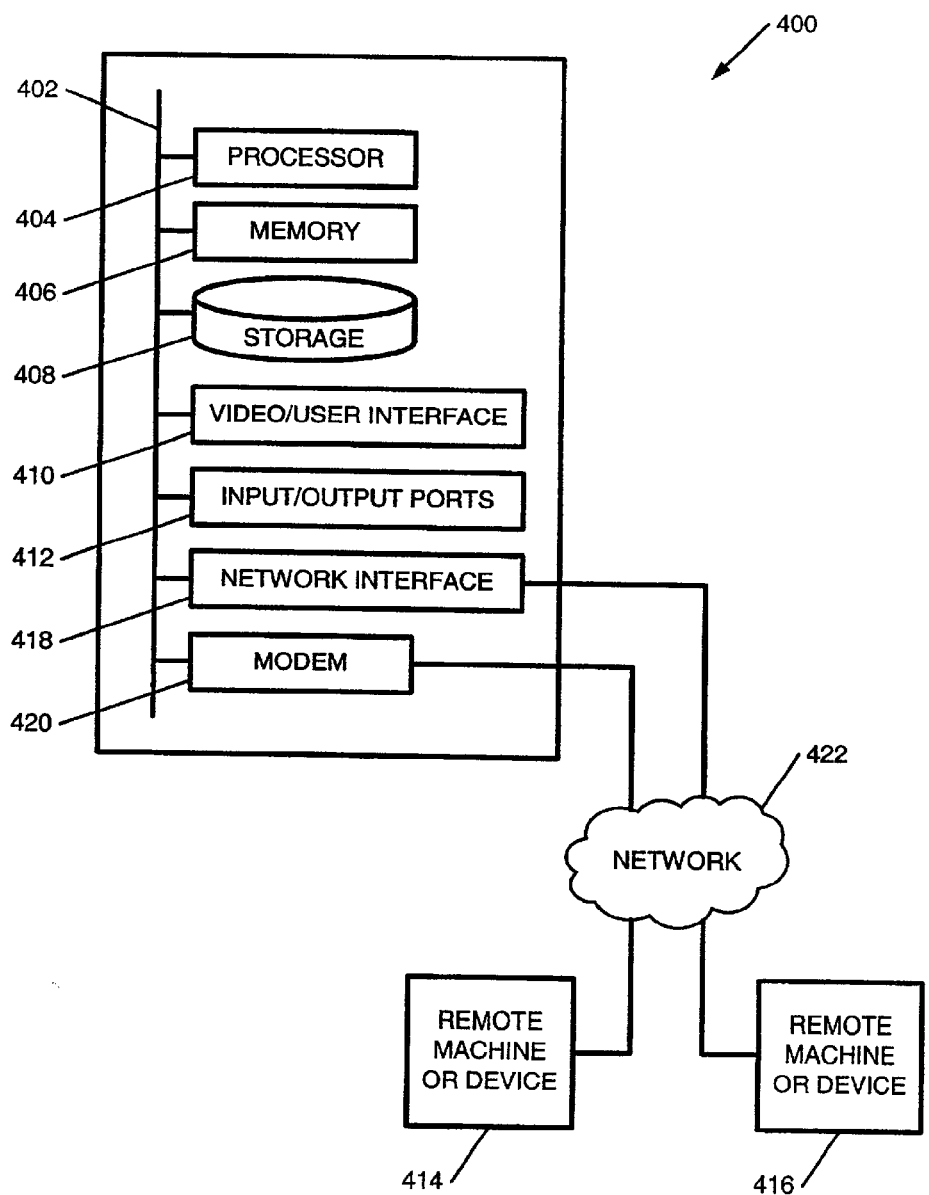
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented.

An exemplary machine 400, e.g., a computer or other device, for controlling the projectors 102 (FIG. 1), 200 (FIG. 2) includes a system bus 402. Typically, attached to the bus are processors 404, a memory 406 (e.g., RAM, ROM), storage devices 408, a video interface 410, and input/output interface ports 412.

The system may also include embedded controllers, such as Generic or Programmable Logic Devices or Arrays, Application Specific Integrated Circuits, single-chip computers, smart cards, or the like, and the system is expected to operate in a networked environment using physical and/or logical connections to one or more remote machines 414, 416 through a network interface 418, modem 420, or other data pathway. Systems may be interconnected by way of a wired or wireless network 422, such as an intranet, the Internet, local area networks, wide area networks, cellular, cable, laser, satellite, microwave, short range wireless networks such as "BlueTooth" type networks, optical, infrared, or other short range or long range wired or wireless carrier.

The invention may be described by reference to or in conjunction with program modules, including functions, procedures, data structures, application programs, etc. for performing tasks, or defining abstract data types or low-level hardware contexts. Program modules may be stored in memory 406 and/or storage devices 408 and associated storage media, e.g., hard-drives, floppy-disks, optical storage, magnetic cassettes, tapes, flash memory cards, memory sticks, digital video disks, biological storage. Program modules may be delivered over transmission environments, including network 422, in the form of packets, serial data, parallel data, propagated signals, etc. Program modules may be used in a compressed or encrypted format, and may be used in a distributed environment and stored in local and/or remote memory, for access by single and multi-processor machines, portable computers, hand-held devices, e.g., Personal Digital Assistants (PDAs), cellular telephones, or the like.

Thus, for example, with respect to the illustrated embodiments, assuming machine 400 operates to control the projectors 102, 200, then remote machines 414, 416 may respectively be the projectors 102, 200, and a transceiver-based system for detecting illicit recorders. It will be appreciated that remote machines 414, 416 may be configured like machine 400, and therefore include many or all of the elements discussed for machine. It should also be appreciated that machines 400, 414, 416 may be embodied within a single device, or separate communicatively-coupled components.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for interfering with illicit attempts to record an event, comprising:
   identifying a starting point for projecting interference during an event; and
   emitting a radiation that is not human perceptible during the event that will interfere with recording devices used during the event, wherein the radiation comprises infrared.

2. The method of claim 1, wherein the emitting the radiation occurs according to a selected one of the following intervals: randomly during the event, continuously during the event, at selected moments of interest during the event.

3. The method of claim 1, further comprising:
   emitting the radiation according to a pattern.

4. The method of claim 3,
   wherein the pattern comprises selected ones of: a watermark, purchase instructions for obtaining a legitimate copy of the event, a message.

5. The method of claim 3, wherein the pattern comprises a text message.

6. The method of claim 3, further comprising:
   projecting the event against a viewing surface that will reflect the radiation; and
   emitting the radiation towards the viewing surface so that illicit attempts to record the event result in a recording of the radiation as well.

7. The method of claim 1, wherein determining the interference starting point comprises detecting the start of the event.

8. The method of claim 7, wherein detecting the start of the event comprises detecting a starting signal issued during the event for triggering starting interference.

9. The method of claim 8, wherein the event is provided as a recording, and wherein the signal is embedded within the recording.

10. The method of claim 7, wherein detecting the start of the event is based at least in part on detecting a change in human-perceptible characteristics of the event.

11. The method of claim 10, wherein the changed human-perceptible characteristic comprises at least one of: a change in lighting for the event, a change in sound for the event, and a change in texture.

12. A method for interfering with illicit attempts to record an event, comprising:
    identifying a starting point for projecting interference during an event; and
    emitting a radiation that is not human perceptible during the event that will interfere with recording devices used during the event;
    wherein the emitting the radiation comprises emitting control instructions to affect operation of recording devices used during the event.

13. The method of claim 12, wherein the control instructions comprise selected ones of the following operation commands: stop, rewind, fast forward, power off, power on, erase recording media, identify the recording device, and sound theft alarm.

14. An article, comprising:
    a machine-accessible media having associated data for interfering with illicit attempts to record an event, wherein the data, when accessed, results in a machine performing:
    identifying a starting point for projecting interference during an event; and
    emitting a radiation that is not human perceptible during the event that will interfere with recording devices used during the event, wherein the radiation comprises infrared.

15. The article of claim 14 wherein the machine-accessible media further includes data, when accessed by the machine, results in the machine performing:
    emitting the radiation according to a pattern.

16. The article of claim 15 wherein the machine-accessible media further includes data, when accessed by the machine, results in the machine performing:
    projecting the event against a viewing surface that will reflect the radiation; and
    emitting the radiation towards the viewing surface so that illicit attempts to record the event result in a recording of the radiation as well.

17. The article of claim 14 wherein the data corresponding to determining the interference starting point includes further data, when accessed by the machine, results in the machine performing:
    detecting the start of the event.

18. The article of claim 17 wherein the data corresponding to detecting the start of the event includes further data, when accessed by the machine, results in the machine performing:
    detecting a starting signal issued during the event for triggering starting interference.

19. The article of claim 18, wherein detecting the start of the event is based at least in part on detecting a change in human-perceptible characteristics of the event.

20. An article comprising a machine-accessible media having associated data for interfering with illicit attempts to record an event, wherein the data, when accessed, results in a machine performing:
    identifying a starting point for projecting interference during an event:
    emitting a radiation that is not human perceptible during the event that will interfere with recording devices used during the event; and emitting control instructions to affect operation of recording devices used during the event.

21. A system comprising:

a focus area in which an event may be presented; and one or more emitters disposed about the focus area configured to emit a human imperceptible emission perceptible to a recording device used to record the event, wherein the human imperceptible emission comprises infrared.

22. The system of claim 21, wherein the human imperceptible emission comprises selected ones of: control instructions which when received by the recording device result in a change of state for the recording device, and a message which becomes human perceptible in a recording of the human imperceptible emission.

23. The system of claim 21, wherein the focus area is a selected one of: a stage, a screen, and a projection surface.

24. The system of claim 21, wherein a first one of the emitters is configured to emit at least a portion of the human imperceptible emission towards the focus area.

25. The system of claim 21, wherein at least one of the emitters is configured to emit a message which becomes human perceptible in a recording of the human imperceptible emission, wherein the message comprises selected ones of an advertisement, a theft warning, a watermark, and a legal notice.

26. The system of claim 21, further comprising:

an event monitor operable to identify points of interest within the event;

an emission control communicatively coupled with the event monitor and operable to activate at least one emitter when a point of interest is identified.

27. A system comprising:

a focus area in which an event may be presented: and one or more emitters disposed about the focus area configured to emit a human imperceptible emission perceptible to a recording device used to record the event;

wherein a first one of the emitters is configured to emit at least a portion of the human imperceptible emission towards the focus area, and wherein a second one of the emitters is configured to emit at least a portion of the human imperceptible emission away from the focus area.

* * * * *